United States Patent [19]

Henderson

[11] 4,252,255

[45] Feb. 24, 1981

[54] MECHANISM FOR PURGING A PLURAL COMPONENT MIXING AND DISPENSING GUN

[76] Inventor: David Henderson, 14 Chester Rd., Darien, Conn. 06820

[21] Appl. No.: 20,031

[22] Filed: Mar. 13, 1979

[51] Int. Cl.³ .............................................. B67D 1/10
[52] U.S. Cl. ..................................... 222/135; 15/3.5; 137/268; 222/149
[58] Field of Search ............... 222/135, 145, 148, 149; 239/114–117; 15/3.5, 104.06 A, 104.16; 137/268; 221/96

[56] References Cited

U.S. PATENT DOCUMENTS

| | | | |
|---|---|---|---|
| 1,495,008 | 5/1924 | Feagin | 15/104.16 X |
| 3,146,477 | 9/1964 | Bergman et al. | 137/268 X |
| 3,175,240 | 3/1965 | Hillard | 137/268 X |
| 3,263,928 | 8/1966 | Gusmer | 239/414 X |
| 3,366,337 | 1/1968 | Brooks et al. | 239/414 |
| 3,531,813 | 10/1970 | Hurst | 15/104.06 A |
| 4,050,955 | 9/1977 | Southgate | 15/104.06 A X |
| 4,133,483 | 1/1979 | Henderson | 239/527 X |

*Primary Examiner*—Robert J. Spar
*Assistant Examiner*—Fred A. Silverberg
*Attorney, Agent, or Firm*—Curtis, Morris & Safford

[57] ABSTRACT

A gun for mixing and dispensing plural component plastic materials, for example, polyurethane foam, is provided with a purging device operable independently of the foam mixing and dispensing mechanism. The purging device comprises a rod, normally positioned rearwardly of the foam component inlet orifices and mixing chamber, the rod being selectively actuable independently of the foam mixing and dispensing operations, by a two way air cylinder controlled by the gun operator. Purging elements, for example, compressible spheres or plugs of a plastic material such as styrene are fed under pressure to seat in a position rearwardly of the foam component inlet orifices and mixing chamber. Upon selective actuation of the rod, one of the spheres is forced through the mixing chamber to purge any residual foam components by a scraping action.

8 Claims, 2 Drawing Figures

MECHANISM FOR PURGING A PLURAL COMPONENT MIXING AND DISPENSING GUN

BACKGROUND OF THE INVENTION

1. Field of the Invention

This invention relates to guns for mixing and dispensing plural component plastic materials, for example, polyurethane foam, and particularly to an improved arrangement for purging residue from the mixing chamber.

2. Description of the Prior Art

The purging device of this invention relates to plural component plastic application equipment or guns of the general type described and claimed in U.S. Pat. Nos. 3,366,337 and 4,133,483 wherein two coreactive streams of chemicals are intimately mixed within the gun and dispensed as a fluent stream or spray. The present invention will be described in connection with plural component foam producing chemicals, but is understood to be generally applicable to mixing guns of the general character irrespective of the particular chemicals used.

One problem which arises in prior art foam guns is that, between operations, the residual material in the mixing chamber and/or outlet nozzle tends to harden and jam the outlet thereby making further mixing and dispensing impossible until the chamber and nozzle are purged of the hardened residue. Purging is accomplished, for example, in the aforementioned U.S. Pat. No. 3,366,337, by manually opening a needle valve to admit a flow of solvent and/or air through the chamber and nozzle to remove the residue.

This purging procedure had several disadvantages. First, the basic operation required the use of two hands because the needle was opened and closed by a threaded knob. Second, the use of solvent added unnecessary expense to the foam process. Further, the solvent, because of being ejected under pressure, was dispersed into the surrounding air and created a potential safety and health problem. Still further, the blast of solvent and/or air, while forcefully ejecting the hardened foam, scattered the residue haphazardly. Overall, this cleaning arrangement was inefficient.

Other prior art arrangements, such as for example Gusmer U.S. Pat. No. 3,263,928 and Gusmer et al U.S. Pat. No. 2,890,836, in an attempt to overcome the mentioned difficulties, utilize a rod to eject excess material between spraying operations. In these devices, the rod purports to purge the mixing chamber and outlet nozzle on a single stroke each time the gun is shut off. However, such rods were designed to scrape the walls of the chamber, were utilized as the valving mechanism to open and close the infeed orifices and, for this reason, could be utilized for only one purging stroke for each dispensing operation. In practice, it was found that on the return stroke the rod tended to pull back some of the residue. If the gun was then left unused for a period of time, the residue hardened and bonded causing the gun to jam. For this reason, such guns utilized a solvent bath giving rise to the same problems mentioned heretofore relative to other prior art foam guns.

In the aforementioned U.S. Pat. No. 4,133,483, purging is accomplished through a purging rod operable separate from and independently of the foam mixing and dispensing means of the gun. The purging rod is not utilized to open and close the inlet ports for the chemicals which form the foam. Thus the gun may be used several times without using the purging device. However, use of solvents to insure complete removal of foam residue is still necessary.

OBJECTS AND SUMMARY OF THE INVENTION

The present invention overcomes the difficulties and drawbacks of prior art plural component dispensing guns by eliminating the need to use a solvent bath or solution. The present invention utilizes a compressible sphere of a plastic material which is forced by air under pressure to seat in a position rearwardly of the foam component inlet orifices and mixing chamber. A movable rod positioned rearwardly of the seated spherical ball is selectively actuable independently of the foam mixing and dispensing operation to force the ball through the mixing chamber thereby to scrape the walls of the chamber to remove foam residue without requiring a separate solvent bath. Elimination of the bath lowers the cost of operation and provides an added safety measure as a source of combustible material and noxious fumes, e.g. solvent, is not required.

It is therefore an object of this invention to provide a plural component dispensing gun having provision to purge any residue of foam material without requiring the use of solvent baths.

It is a further object of the present invention to provide a plural component dispensing gun which overcomes the drawbacks and disadvantages of prior art guns of the same type.

Objects and advantages of the present invention will be apparent from the following detailed description.

DETAILED DESCRIPTION OF A PREFERRED EMBODIMENT

Figure 1:
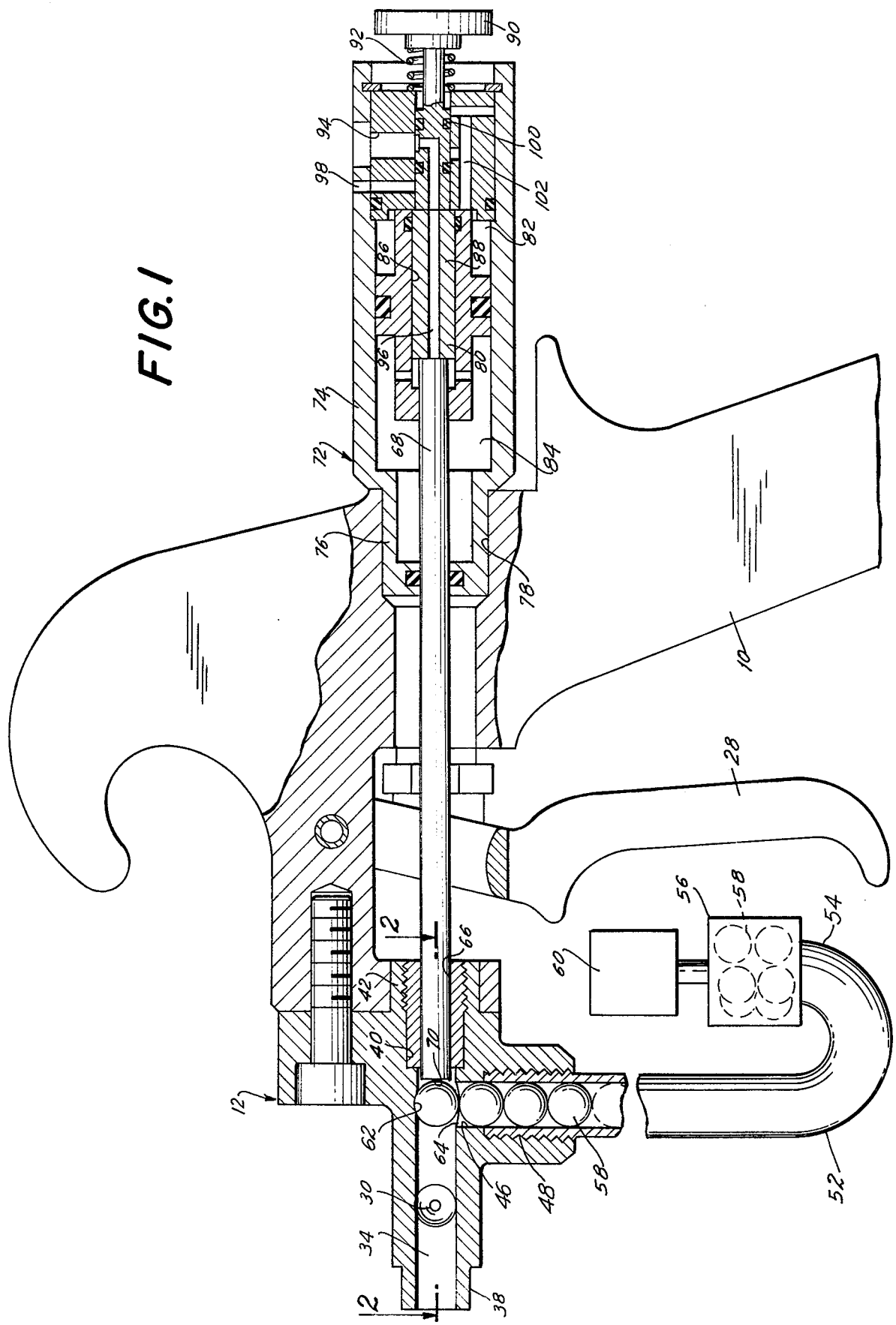
FIG. 1 is a side elevational view of the gun of the present invention, partly in vertical longitudinal section.
Figure 2:
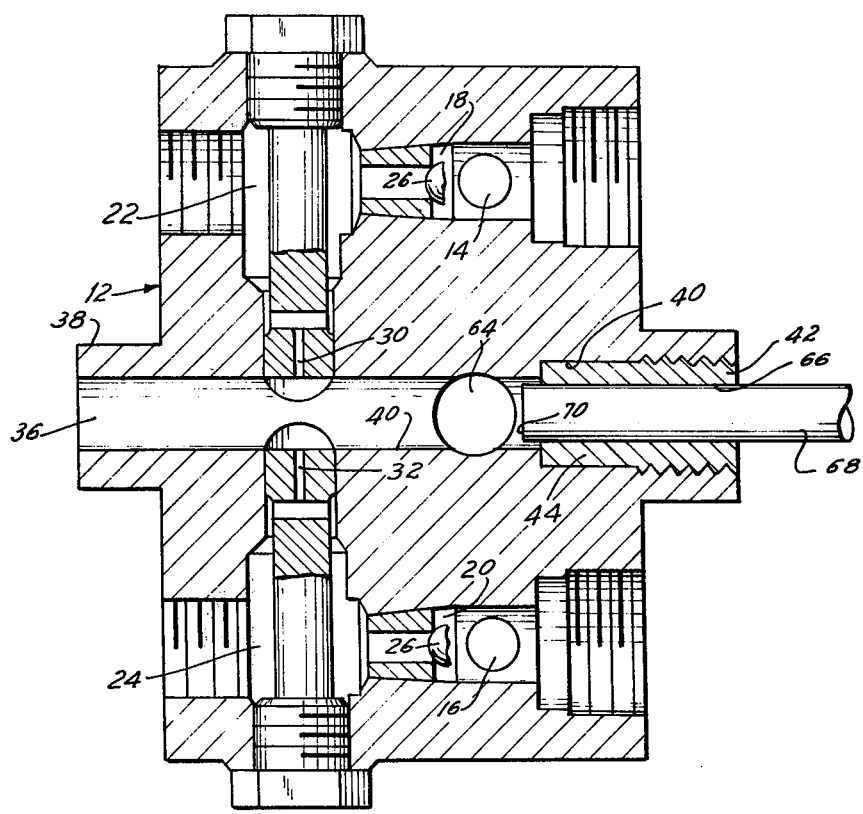
FIG. 2 is a fragmentary longitudinal section, taken substantially on line 2—2 of FIG. 1, of the spray head of the gun.

Referring to the drawings, a dual component dispensing gun 10 is shown having a gun head 12, modified in accordance with the present invention, secured thereto.

The valving details, controls, chemical component supply sources and the like, have been omitted for brevity because, in this preferred embodiment, they are identical to those described in the aforementioned U.S. Pat. No. 3,366,337, which is incorporated herein by reference.

Briefly, the liquid chemical reactant components are supplied through inlet orifices 14 and 16 to chambers 18 and 20. The chambers 18 and 20 communicate with opposed cross-bores or ducts 22 and 24 and the flow of each liquid chemical is controlled by valve means, fragmentarily indicated by reference numeral 26.

As is known in the art, the two valve means 26 are normally closed but are opened substantially simultaneously when dispensing is desired by movement of a gun trigger 28 by the operator of the device. When valves 26 are opened, the chemical reactants flow into ducts 22-24 and through impingement orifices 30 and 32 into a cylindrically shaped mixing chamber 34 where they are thoroughly mixed. The mixture then being ejected from a discharge outlet 36 formed in cylindrical extension 38 at the exit end of the mixing chamber 34.

The rearward end of the gun head 12 is provided with a bore 40 axially aligned with mixing chamber 34, the bore being threaded for a portion of its length to receive the threaded portion 42 of a sleeve 44, the main body of which is snuggly and sealingly received in the bore 40. The sleeve 44 is preferably formed of Teflon or other low friction material.

A bore 46 is provided in gun head 12 to intersect the bore 40 at a point spaced rearwardly from the location of the impingement orifices 30 and 32. Bore 46 is threaded, as at 48, to threadably receive one end 50 of a tube 52. Tube 52 is preferably a flexible plastic material having its other end 54 connected to a container 56 holding a supply of compressible plastic spheres 58. Air under pressure supplied from a pressure source 60 passes through container 56 to direct spheres 58 through tube 52.

Each sphere 58 has a diameter slightly larger than the diameter of mixing chamber 34 and under pressure from air source 60 one sphere enters bore 40 and is seated in a spherical depression 62 formed on the surface of bore 40 opposite bore 46. The sphere so seated has its lowermost segment, as viewed in FIG. 1, disposed within the opening 64 formed by the intersection of bore 46 and bore 40 to preclude further movement of spheres 58 into the chamber and to seal the opening as well to preclude any flow of air from pressure source 60 into the gun.

The sleeve 44 is provided with an axial bore 66 in which a purging rod 68 is slidingly and sealingly received. Purging rod 68 is coaxial with and preferably of a smaller diameter than the bore 40 so that the rod does not scrape on the inner wall of the chamber. The end 70 of purging rod 68 in is retracted position, as shown in the drawings, is positioned rearwardly of the inlet orifices 28 and 30 and rearwardly of a sphere 58 seated in bore 40.

An important feature of the present invention is that rod 68 and a sphere 58 are utilized only for purging the mixing chamber and outlet and has nothing whatsoever to do with the starting and stopping of the mixing or dispensing operations. In other words, the gun may be operated several consecutive times without using the purging rod and, conversely, the purging rod may be moved through any number of consecutive purging strokes without utilizing the mixing or dispensing mechanisms. This is extremely advantageous because it is at times difficult to adequately purge the mixing chamber and outlet nozzle of the gun with a single stroke.

The purging rod, in the preferred embodiment, is operated by a double acting air cylinder, designated generally in FIG. 1 by the numeral 72.

The clyinder body 74 has a forward portion 76 which is removably fitted without an opening 78 in the rearward surface of the gun body 10 coaxial with the mixing chamber 34. A piston 80, which is secured to the purging rod for movement therewith, divides the cylinder bore into an advance chamber 82 and return chamber 84.

Piston 80 is provided with an axial bore 86 in which is slidably received a valving rod 88 having its rearward end projecting outwardly of the cylinder body and provided with a push button 90. A spring 92 biases the valving rod to an outward or retracted position.

Air under pressure is fed from a suitable source into inlet opening 94, through axial port 96 in rod 88, the forward portion of bore 86, and into return chamber 84, thereby normally holding all of the cylinder elements and the purging rod 68 in a retracted position as shown in the drawings.

When the foam gun operator at any time desires to operate the purging rod to purge excess or residual material from the mixing chamber 34, he merely depresses the push button 90, moving the valving rod 88 forwardly in the piston 80. This movement causes the port 96 to become aligned with an air outlet or exhaust opening 98 and permits the air in return chamber 84 to escape through exhaust opening 98. Simultaneously, air is admitted through a second port 100 in the valving rod 88 and through a passage 102 into advance chamber 82, pushing the piston 80 and purging rod 68 forward. Release of the push button reverses the foregoing procedure so that the piston and purging rod are returned to the position shown in the drawings.

When it is desired to purge the gun of residual foam material, push button 90 is depressed to extend purging rod 68. End 70 of purging rod 68 contacts the sphere 58 seated in bore 40 and the force of rod 68 pushes the sphere into bore 40 compressing it slightly. Sphere 58 completely fills bore 40 and as rod 68 continues to extend the sphere moves down the bore scraping any residual foam material and pushing it along ahead of the sphere. The stroke of piston 80 is sufficiently long to drive the purging rod 68 through the mixing chamber 34 to expel the sphere 58 out the discharge outlet 36.

During the purging stroke purging rod 68 is disposed above the sphere inlet opening 64 precluding entry of the next sphere into bore 40. Upon retraction of rod 68 to its initial position air pressure from source 60 forces the next sphere into bore 40 where it seals opening 42 as noted above.

It is apparent from the above description that the purging rod may be selectively utilized for any desired number of purging strokes completely independently of any foam mixing or operations. This is critical to adequate and complete purging because it is virtually impossible to perform adequate purging with a single stroke of a rod without the messy, hazardous use of cleaning fluids. Such cleaning fluids are entirely eliminated with this invention.

Also, the purging rod and its actuating air cylinder are readily removable by hand from the gun for maintenance by simply unscrewing or sliding the air cylinder out of the gun body and retracting the purging rod rearwardly through the head and body of the gun.

It will be obvious to those skilled in the art that the purging arrangement of the present invention may be utilized in many types of foam guns and is not limited to use with the preferred gun illustrated herein by way of example.

It will also be obvious that variations may be made in the two way valve system without departing from the spirit of the invention. As one example, the push button control may comprise a remote control switch mounted on the gun body below the two way cylinder and therefore be considered even more conveniently accessible to the operator of the device.

What is claimed is:

1. In a plural component mixing and dispensing gun comprising a gun body, a head secured to said body, said head having a mixing chamber with a discharge outlet at its forward end, inlet orifices communicating with said chamber, means for intermittently feeding streams of reactant liquids through said orifices into said chamber so that the liquids form a reactive mixture which is discharged through said discharge outlet, said reactive mixture being one which solidifies rapidly after reactive mixtures of said liquids and said head including an opening axially aligned with said chamber disposed rearwardly thereof, the improvement comprising purging means selectively operable to purge said mixing chamber of residual reactant mixture including means to insert a separate scaping member into said opening at an angle to an axis of the opening and a purging rod received in said opening, said scraping member being positioned between the end of said purging rod and said inlet orifices to effectively seal the purging rod from contact with liquid introduced into said mixing chamber, said rod being selectively movable from a first retracted position having an end spaced rearwardly from said scraping member to a second extended position, wherein said purging rod abuts said scraping member to move said scraping member through said opening and said mixing chamber and out said discharge outlet to purge said mixing chamber of residual reactant mixture and any reactant mixture which has solidified as said purging rod moves from said first position to said second position.

2. A gun as defined in claim 1 wherein said scraping member comprises a spherical member of compressible plastic material having a diameter slightly greater than the diameter of said opening and mixing chamber whereby movement of said spherical member through said opening and mixing chamber scrapes any residual mixture to purge said gun of such residual mixture.

3. A gun as defined in claim 2 wherein said means to insert includes means to sequentially feed one of a plurality of said spherical members within said opening in said gun.

4. A gun as defined in claim 3 wherein said means to sequentially feed said spherical members includes a source of air under pressure flowing through storage means containing a plurality of said spherical members, tube means through which said spherical members can flow connecting said storage means to said gun, and passage means formed in said gun to receive said spherical members and direct them for insertion into said opening.

5. A gun as defined in claim 2 including receiving means formed in said gun to hold and retain one of said spherical members in sealing relationship in said opening to preclude feeding of additional spherical members into said opening.

6. A gun as defined in claim 1 including means for biasing said rod in said first retracted position.

7. A gun as defined in claim 6 wherein said biasing means comprises a double acting air cylinder mounted on the gun and having a piston secured to the purging rod and movable therewith and normally air biased into a retracted position, and wherein the means for moving the purging rod on a purging stroke comprises a push button pressure actuable to reverse the air flow in said cylinder to move the piston and rod forwardly, said push button being spring biased to retracted position upon release of pressure thereon.

8. A gun as defined in claim 7 including an opening in the gun body within which said air cylinder is removably received, whereby said cylinder and said purging rod are readily removable from the gun.

* * * * *